(12) United States Patent
Fee

(10) Patent No.: US 8,359,000 B2
(45) Date of Patent: Jan. 22, 2013

(54) PORTABLE EMERGENCY DEVICE

(76) Inventor: Barbara J. Fee, Bloomfield Hills, MI (US)

( * ) Notice: Subject to any disclaimer, the term of this patent is extended or adjusted under 35 U.S.C. 154(b) by 56 days.

(21) Appl. No.: 12/795,165

(22) Filed: Jun. 7, 2010

(65) Prior Publication Data

US 2011/0045797 A1    Feb. 24, 2011

Related U.S. Application Data

(63) Continuation-in-part of application No. 12/545,838, filed on Aug. 23, 2009, now abandoned.

(51) Int. Cl.
*H04M 11/04* (2006.01)
(52) U.S. Cl. ............... 455/404.2; 455/404.1; 455/456.1; 455/456.3
(58) Field of Classification Search ....... 455/404.1–409, 455/414.1–415, 440, 456.1–458, 422.1, 423
See application file for complete search history.

(56) References Cited

U.S. PATENT DOCUMENTS

| | | | |
|---|---|---|---|
| 6,226,510 B1 | 5/2001 | Boling et al. | |
| 2003/0040285 A1* | 2/2003 | Whitley | 455/90 |
| 2008/0096521 A1* | 4/2008 | Boling et al. | 455/404.2 |
| 2009/0224932 A1* | 9/2009 | Kilim et al. | 340/686.6 |
| 2009/0305752 A1* | 12/2009 | Kim | 455/575.1 |

\* cited by examiner

*Primary Examiner* — Chuong A Ngo
(74) *Attorney, Agent, or Firm* — Gifford, Krass, Sprinkle, Anderson & Citkowski, P.C.

(57) ABSTRACT

A portable emergency device is disclosed. The device contains an internal antenna for allowing two-way communications, a speaker, an activation button to be pressed in case of an emergency, a microphone, a battery for powering the device and a GPS tracking device that allows emergency personnel to locate the person. The device performs in two operation modes, wherein in one mode a call is placed to a public emergency service provider, and in the second mode a call is placed to the public emergency service provider and a recorded message is transmitted along with the location of the device. The device is particularly useful for the elderly and the handicapped that they can use in case of an emergency.

18 Claims, 4 Drawing Sheets

PORTABLE EMERGENCY DEVICE

CROSS-REFERENCE TO RELATED APPLICATIONS

This application is a continuation-in-part of U.S. patent application Ser. No. 12/545,838 filed Aug. 23, 2009.

BACKGROUND OF THE INVENTION

The present invention generally relates to a portable emergency device (PED) and, more specifically, to a PED having a global positioning system (GPS) operable to detect the present location of the PED and is further operable to allow two-way conversation with emergency personnel.

Elderly and handicapped people often have a difficult time seeing and using cell phones or other communication devices in an emergency. Currently, there are no easy-to-use portable devices that they can use in the home and take with them when they leave the home. Furthermore, there are no portable devices that may be easily used by people in a state of distress. Accordingly, there remains a need for a user-friendly device for the elderly and the handicapped that they can use in case of an emergency.

SUMMARY OF THE INVENTION

In one aspect of the present invention, a portable emergency device including a housing and an inner section having an internal antenna disposed inside the inner section is provided. The antenna is operable to transmit and receive signals to and from a designated host. The device further includes a speaker and a microphone disposed on the housing; an actuator positioned on the housing; a recorder for recording messages, a battery for powering the device disposed inside the inner section; and a GPS disposed inside the inner section. The device is operable to call a designated public emergency service provider (PESP) with one actuation of the actuator. With a second actuation of the actuator, the device is operable to send a recorded message to the designated PESP followed by the location of the user.

In another aspect of the present invention, a method for contacting a designated PESP by a person in an emergency situation is provided. The method includes the step of actuating an actuator once so as to place the device in a first operation mode, or actuating the actuator twice so as to place the device in a second operation mode. Accordingly, the method provides for a simple way for a distressed person to reach PESP, regardless of whether the distressed person is able to speak.

In the first operation mode, the method includes the step of actuating the GPS unit and obtaining the user's present location. The first mode of operation further includes the step of placing a call directly to a designated public emergency service provider (PESP) wherein the user may communicate to the designated public emergency provider the nature of the distress and the user's present location.

In the second operation mode the method includes the step of placing a call directly to a designated PESP and playing a recorded message providing the PESP the user's information. The second operation mode further includes the step of providing the PESP with the user's current GPS location.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally relates to a portable emergency device 10 with GPS 12 that allows two-way conversation with an operator of a public emergency service provider (PESP) when operating in a first operation mode, and provides a recorded message with the operator when operating in a second operation mode.

Figure 1:
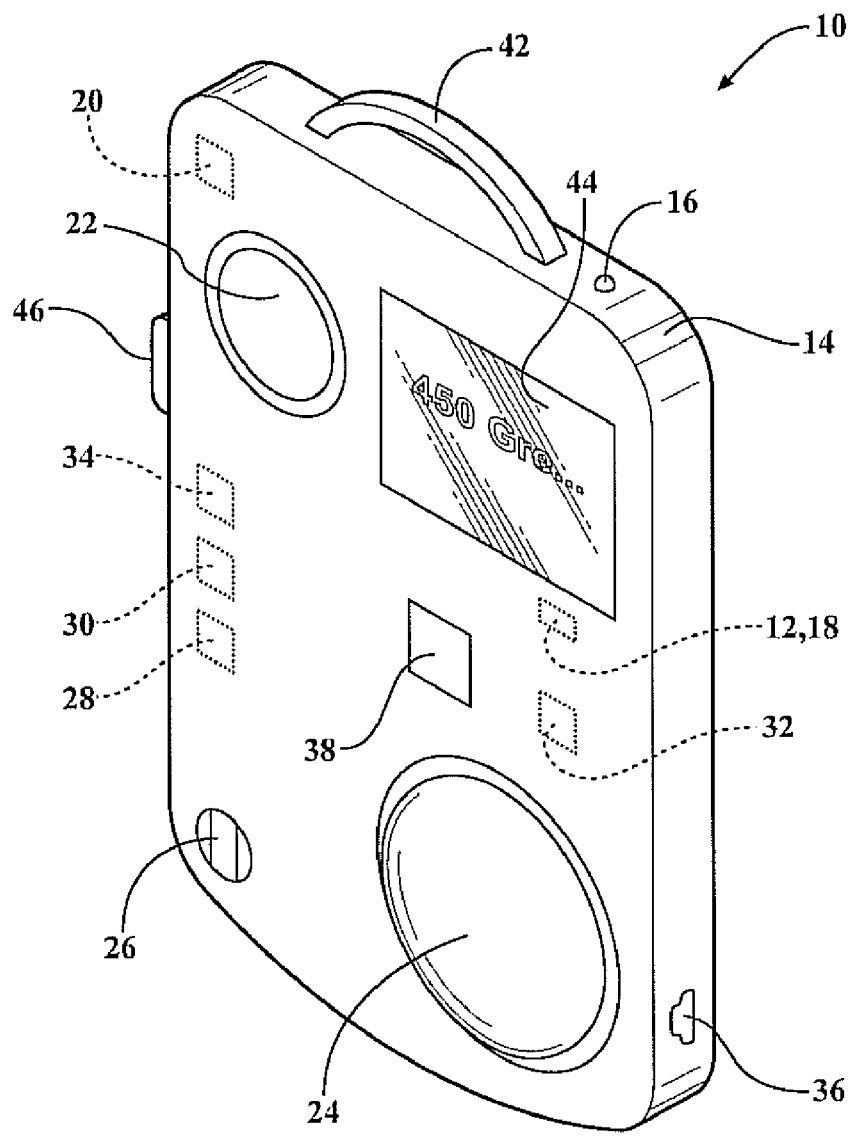
FIG. 1 is a schematic view of the device according to an embodiment of the present invention.

With reference now to FIG. 1, an illustration of an embodiment of the device 10 is provided. Preferably, the device 10 configured for hand held use. For instance, the device 10 may be approximately 2 inches wide, 3 inches long and a ¼ inch thick. The device 10 includes a housing 14 formed from a durable material that may be shock proof, water resistant rubberized plastic. The housing 14 is operable to protect the interior components of the device 10. The device 10 may further include circuitry and components similar to a cellular telephone with two-way radio capability. Preferably, the device 10 is also light weight and easy to carry, and may be worn as a pendant, or clipped onto clothing, a purse, or a vehicle visor.

The device 10 may further include a GPS 12. Any GPS 12 currently known and used in the art is adaptable for use herein, illustratively including a GPS tracking device 18 which is operable to push data to the designated PESP. More specifically, the GPS tracking device 18 operable to transmit the longitudinal and latitudinal coordinates of the device 10. Accordingly, the designated PESP is provided with the user's location and may be able to find the user in the event the user does not know where he or she is located, or is unable to speak. Such a device 10 may be useful where public emergency providing services commonly known as "enhanced 911" is available. Enhanced 911 service providers are capable of extracting the GPS 12 location of the device 10 and may direct public agency to the location of the user and the nature of the user's distress.

The device 10 may further include an antenna 20 operable to transmit and receive signals through a cellular service provided. The device 10 further includes a speaker 22, an actuator 24, a microphone 26, a recorder 28, a processor 30, and a battery 32. The microphone 26 is operable to receive communications from the user for transmission to the PESP operator. The processor 30 is operable to actuate the recorder 28 so as to record a message from the user for later transmission to a PESP operator in the event that the user is unable to speak. The processor 30 may store the recorded message in a database 34.

Figure 2:
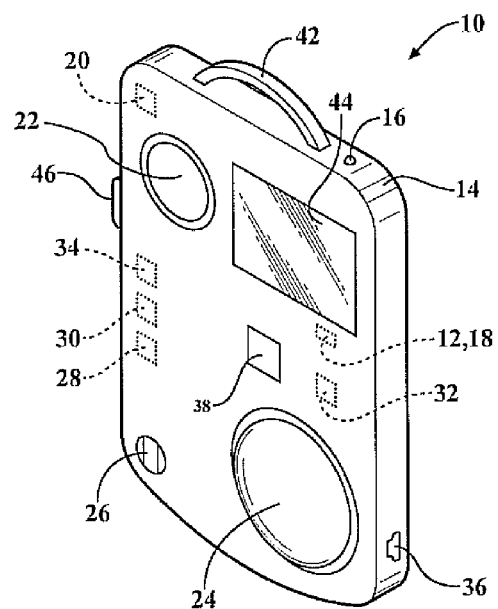
FIG. 2 is a front perspective view of the device according to an embodiment of the present invention.
Figure 3:
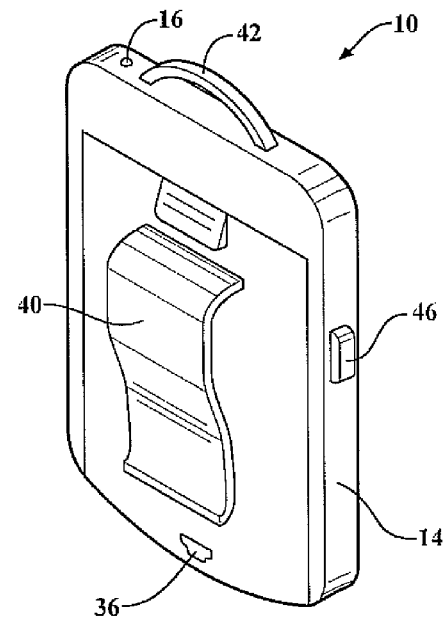
FIG. 3 is a rear perspective view of the device according to an embodiment of the present invention.
Figure 4:
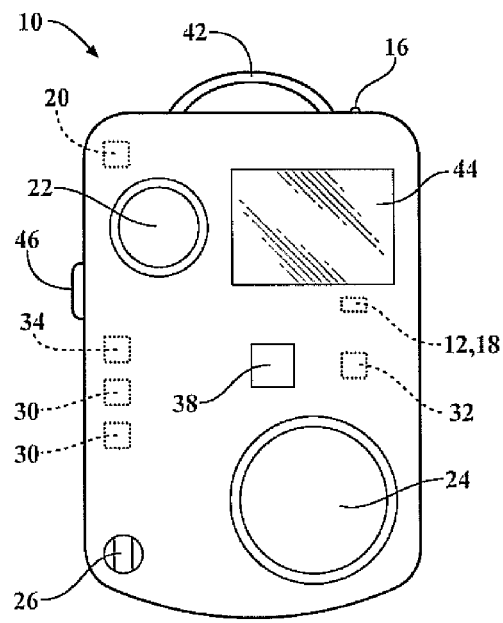
FIG. 4 is a front view of the device according to an embodiment of the present invention.
Figure 5:
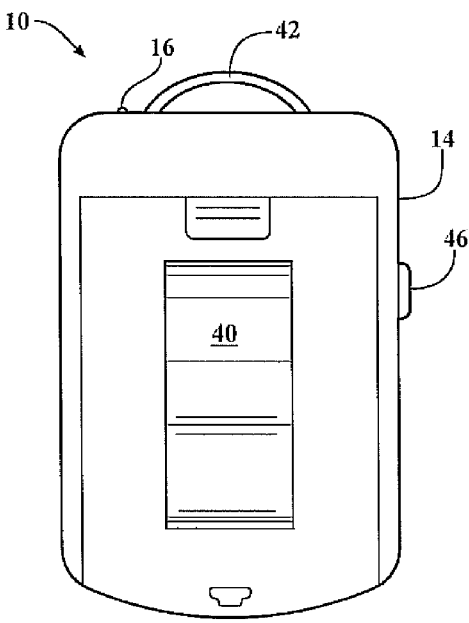
FIG. 5 is a back view of the device according to an embodiment of the present invention.
Figure 6:
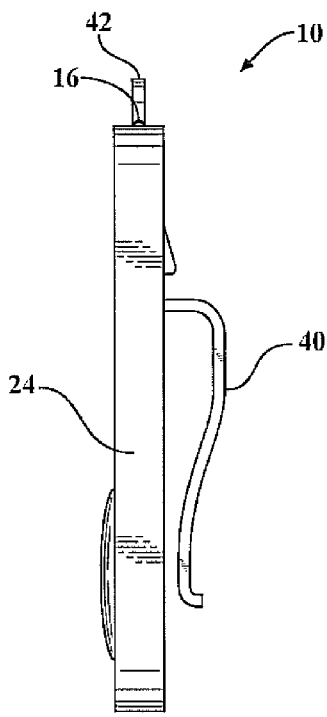
FIG. 6 is a side view of the device according to an embodiment of the present invention.
Figure 7:
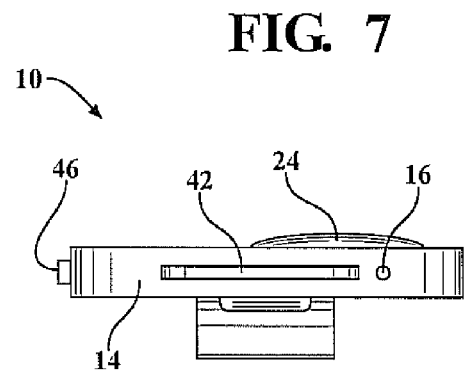
FIG. 7 is a top view of the device according to an embodiment of the present invention.
Figure 8:
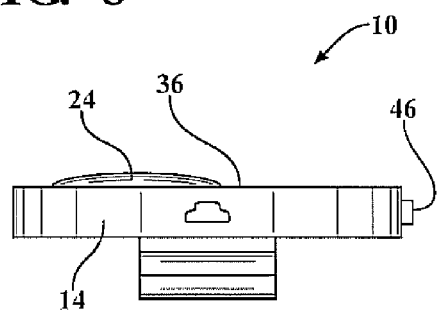
FIG. 8 is a bottom view of the device according to an embodiment of the present invention.
Figure 9:
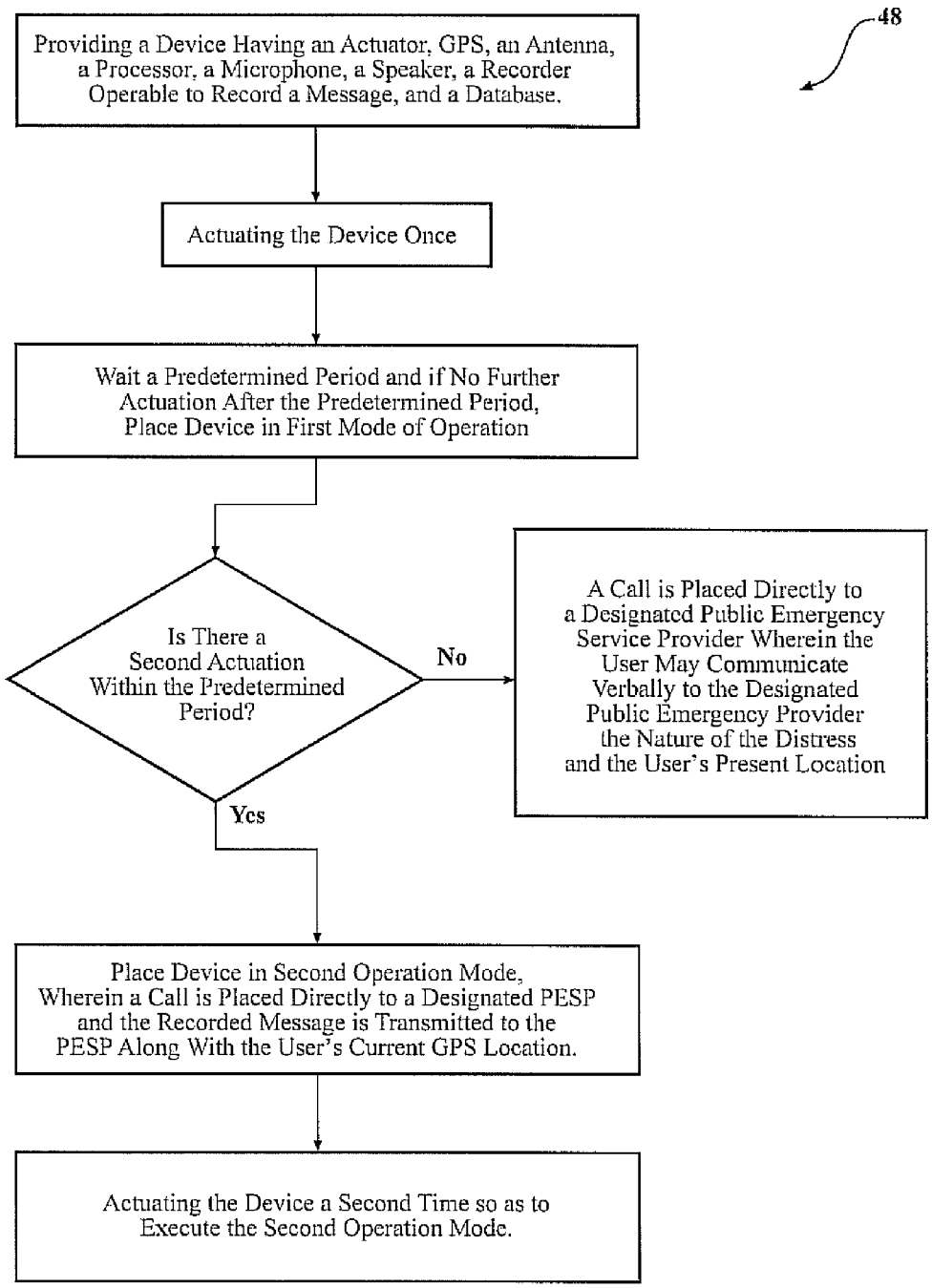
FIG. 9 is a flowchart of a method for using the device according to an embodiment of the present invention.

The battery 32 may be a rechargeable lithium ion battery 32. The device 10 may further include a port 36 in communication with the battery 32. The port 36 is operable to receive a line such as a vehicle charger or a table-top charger that allow the device 10 to be recharged. The port 36 may be configured to receive a micro universal serial bus (Micro USB) operable to not only charge the device 10, but to download a recorded message onto the database 34. The port 36 may be disposed on any location of the housing 14. For instance, FIGS. 1 and 2 shows the port 36 disposed on the side of the housing 14, whereas FIG. 3 shows the port 36 on the lower back side of the housing 14, and FIG. 8 shows the port 36 disposed on the bottom of the housing 14. These components work together to enable the device 10 to perform in two different modes of operation so as to facilitate communication with a PESP during times of distress.

These components may be adapted for use with elderly or disabled users. For instance, the speaker 22 may be voice-enhanced, meaning that the voice of the PESP operator is amplified so as to help the user's hear the PESP operator's instructions. Voice-enhancement allows the person to hear the emergency operator loud and clear. Further, the actuator 24 may be a button 24 which occupies a relatively large space of the outer surface of the housing 14. Accordingly, actuation of the device 10 is facilitated for user's who may have nerve damage or their physical capacity diminished.

The device 10 may include other features for facilitating use. For instance, the device 10 may be equipped with a light 16 that flashes when the battery 32 falls below a predetermined power. Preferably the light 16 is mounted on the outer surface of the housing 14. The processor 30 is in communication with the battery 32 and is operable to actuate the light 16 when the battery 32 falls below the predetermined power. The processor 30 may be further operable to actuate an in-use light 38 when the device 10 is being used. The processor 30 may be further operable to generate an intermittent audible beep when the device's 10 battery 32 needs to be recharged.

The device 10 may further include attachment features such as a clip 40 or a ring 42. For instance, the clip 40 may be disposed on the back of the unit so as to allow the user to clip 40 the device 10 onto a an article of clothing such as a pocket, purse, belt, a structure having a planar member such as a vehicle visor, or any other handy location. The ring 42 may be mounted on the top of the housing 14 so as to allow the user to attach the device 10 to an attachment device 10 such as a chain or other item and wear as a pendant.

In the event of an emergency, whether at home, or away from home, the user actuates the actuator 24. Depending on the state of the user, the user may elect to actuate the button 24 once or twice so as to perform a first operation mode or a second operation mode. In either case, the device 10 connects to the nearest PESP operator using the attached antenna 20. The indicator light 16 on the antenna 20 flashes red to show the device 10 is in use. In the first operation mode a call is placed directly to the PESP operator. The user speaks into the microphone 26 and hears emergency personnel through the voice-enhanced speaker 22. Additionally, the GPS tracking device 18 may automatically activate and push the current location to the PESP so that emergency personnel can trace the call and determine the whereabouts of the user in the event the user cannot tell emergency personnel their location.

In another embodiment of the first operation mode, the device 10 further includes a display 44. The processor 30 is operable to process the current location of the device 10 and display the current location of the device 10 onto the display 44. Accordingly, the user may read the display 44 and provide the current location to the PESP operator.

In the event that the user is unable to speak, the user actuates the actuator 24 twice. In instances where the actuator 24 is a button 24, the user simply presses the button 24 twice within a predetermined period of each other. For example, the processor 30 may be programmed to wait one second between the first instance of pressing the button 24 before calling the PESP to determine if there will be a second pressing of the button 24. If the button 24 is pressed a second time, then the device 10 enters into the second mode of operation.

The second mode of operation includes placing a call to a designated PESP, and transmitting to the PESP a recorded message followed by the present location of the device 10. The message is customizable by the user so as to include information such as any allergies, or conditions which emergency response units may need to know. The device 10 may further include an input 46 operable to begin recording a communication. Though the input 46 is shown on the side of the housing 14, it should be apparent that the input 46 may be disposed on other locations of the housing 14. Upon actuation of the input 46, the user may speak a message that will be played to the PESP in the event the user cannot speak. For instance, the message may include the user's name, telephone number, person to contact in case of an emergency, and any medical conditions and drug allergies.

After the device 10 plays the recorded message to the PESP, the device 10 is further operable to transmit to the PESP the device's 10 current location. In one embodiment, the processor 30 actuates the GPS 12 so as to retrieve the current GPS 12 location. The processor 30 may be further operable to process the location so as to either transmit the location in an audible communication, or transmit a text message to the PESP containing the current location. Specifically, the processor 30 is operable to process the location so as to transmit to the PESP a spoken communication providing the current location of the device 10. The spoken communication may be in the form of the location spelled out. Thus, for example if the device 10 is located at 450 Green Road, Birmingham Mich., 48009 the device 10 may provide the following processed recording which follows the previously recorded message: "I am going to spell out my location, which is as follows: "Four," "Five, "Zero," "G," "R," "E, "E," "N," "R," "O," "A," "D," "T," "R," "O," "Y," "Four," "Eight," "Zero," "Zero," and "Nine."

In another embodiment, the processor 30 places a call with PESP having GPS 12 receiving capabilities such as enhanced 911. The processor 30 further actuates the GPS tracking device 18 so as to obtain the current location, and provides the PESP with the current GPS 12 location of the device 10.

Accordingly, the device 10 is a one-button device 10 easily handled by a person. The device 10 is small enough to clip 40 onto a pocket or use as a pendant. The device 10 connects a person to a designated PESP upon actuation of the button 24. The device 10 operates in two modes; one mode requires a single press of the button 24 wherein the device 10 works like a phone, connecting directly to the PESP; in another mode the device 10 requires two presses of the button 24 and sends a recorded message and location to the PESP. Accordingly, unlike present devices 10, there is no need for a private third party service provider to handle distress calls. Further, the device 10 is relatively inexpensive to manufacture, and is easily used as there are only two things to remember: press the button 24 once or twice.

The message may be recorded by someone other than the user, who may not be technically savvy enough to perform such an operation. However, the execution of a call in either the first or second mode is easily remembered which is very helpful in instances where the user is in distress, or the user's mental or physical capacity is diminished.

In another aspect of the present invention, a method 48 for contacting a designated PESP by a person in distress is provided. The method 48 utilizes a device 10, such as the device 10 described above. Preferably, the device 10 includes an actuator 24, GPS 12, an antenna 20, a processor 30, a microphone 26, a speaker 22, a recorder 28, and a database 34. The method 48 includes the step of actuating the actuator 24 once so as to place the device 10 in a first operation mode, or actuating the actuator 24 twice so as to place the device 10 in a second operation mode. Accordingly, the method 48 provides for a simple way for a distressed person to reach PESP, regardless of whether the distressed person is able to speak.

In the first operation mode, the method 48 includes step of placing a call directly to a designated public emergency service provider (PESP) wherein the user may communicate to the designated public emergency provider the nature of the distress and the user's present location. The first operation mode may further include the step of actuating the GPS 12 unit and obtaining the user's present location. Preferably, the device 10 further includes a display 44 and the processor 30 is operable to process the current location of the device 10 and display the current location of the device 10 onto the display 44. Accordingly, the user may read the display 44 and provide the current location to the PESP operator.

In the second operation mode the method 48 includes the step of placing a call directly to a designated PESP and playing a recorded message providing the PESP the user's information. The second operation mode further includes the step of providing the PESP with the user's current GPS 12 location. The user's current location may be provided in a text message, or may be given by a pre-recorded verbal communication.

It should be understood, of course, that the foregoing relates to exemplary embodiments of the invention and that modifications may be made without departing from the spirit and scope of the invention as set forth in the following claims.

I claim:
1. A portable emergency device comprising:
   a housing;
   an antenna operable to transmit and receive signals compatible in a cellular network, a battery operable to power the device, a global positioning system (GPS) operable to obtain the location of the device, a processor and a database operable to store a recorded message; and
   a speaker, microphone, and actuator mounted on the housing, the processor operable to process the actuation of the actuator so as to perform in sequence a first mode of operation and then a second mode of operation, in the first mode of operation the device places a call to a public emergency service provider (PESP) and the device is operable to provide two-way communication with the PESP, in the second mode of operation the device provides the recorded message to the PESP and the GPS location of the device, wherein a single actuation of the actuator initiates the first mode of operation and a second actuation of the actuator within a predetermined period of time within the single actuation initiates the second mode of operation.

2. The device as set forth in claim 1, wherein the actuator is a button disposed on the outer surface of the housing.

3. The device as set forth in claim 1, wherein the GPS is a GPS tracking device operable to transmit the longitudinal and latitudinal coordinates of the device.

4. The device as set forth in claim 1, wherein the processor is operable to actuate the GPS and obtain the current location of the device, and the processor is further operable to process the location so as to transmit to the PESP an audible communication providing the current location of the device.

5. The device as set forth in claim 1, further including a port operable to receive a line for charging the battery and for downloading a recorded message.

6. The device as set forth in claim 5, wherein the port is configured to receive a micro universal serial bus.

7. The device as set forth in claim 1, wherein the speaker is voice-enhanced so as to amplify the volume of the verbal communications received through the speaker.

8. The device as set forth in claim 1, further including clip mounted to the outer surface of the housing, the clip operable to engage the device with an article of clothing or a structure having a generally planar member.

9. The device as set forth in claim 1, further including a ring mounted to the outer surface of the housing, the ring operable to receive an attachment device so as to secure the ring to the attachment device.

10. The device as set forth in claim 1, wherein the first mode of operation further includes actuating the GPS so as to obtain the current location of the device.

11. The device as set forth in claim 10, further including a display, the display in communication with the processor, the processor operable to process the current location of the device and display the current location of the device onto the display.

12. The device as set forth in claim 11, wherein the current location of the device is transmitted to the PESP.

13. The device as set forth in claim 1, further including a recorder operable to record a message.

14. A method for contacting a designated public emergency service provider (PESP) by a person in distress, the method includes a device having an actuator, global positioning system (GPS), an antenna, a processor, a microphone, a speaker, a recorder operable to record a message, and a database, the method comprising the steps of:
   actuating the actuator once so as to place the device in a first operation mode, or actuating the actuator twice so as to place the device in a second operation mode, wherein in the first operation mode a call is placed directly to the designated PESP wherein the user may communicate verbally to the designated PESP the nature of the distress and the user's present location, and in the second operation mode the method includes the step of placing a call directly to the designated PESP and playing the recorded message providing the designated PESP, and providing the designated PESP with the user's current GPS location, wherein the device is placed in the first operation mode upon actuation of the actuator, and wherein the device is placed in the second operation mode upon a second actuation of the actuator within a predetermined period of time of the first actuation.

15. The method as set forth in claim 14, wherein the first operation mode further includes the step of actuating the GPS so as to determine the present location of the device.

16. The method as set forth in claim 15, wherein, the second operation mode further includes the step of providing the designated PESP with the user's current GPS location in the form of a text message.

17. The method as set forth in claim 15, wherein, the second operation mode further includes the step of providing the designated PESP with the user's current GPS location in the form of a pre-recorded verbal communication.

18. The method as set forth in claim 14, further including the step of waiting a predetermined period after the first actuation of the actuator before placing the call.

* * * * *